US011800320B2

(12) United States Patent
Stauff et al.

(10) Patent No.: US 11,800,320 B2
(45) Date of Patent: Oct. 24, 2023

(54) SYSTEM AND METHOD FOR INCREASING THE SECURITY OF ROAD USERS WITHOUT AN OWN MOTOR VEHICLE

(71) Applicant: Ford Global Technologies, LLC, Dearborn, MI (US)

(72) Inventors: Sebastian Stauff, Cologne (DE); Ronny Hause, Odenthal (DE); Thomas Arndt, Odenthal (DE); Sascha Haase, Wermelskirchen (DE); Arne Mueller-Grunau, Bonn (DE)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 17/501,610

(22) Filed: Oct. 14, 2021

(65) Prior Publication Data
US 2022/0124453 A1 Apr. 21, 2022

(30) Foreign Application Priority Data
Oct. 16, 2020 (DE) .......................... 102020213084.1

(51) Int. Cl.
*H04W 4/024* (2018.01)
*B60R 25/102* (2013.01)
*B60R 25/24* (2013.01)
*B60R 25/30* (2013.01)
*B60R 25/104* (2013.01)
*H04W 4/029* (2018.01)
(Continued)

(52) U.S. Cl.
CPC ............. *H04W 4/024* (2018.02); *B60R 25/01* (2013.01); *B60R 25/102* (2013.01); *B60R 25/104* (2013.01); *B60R 25/24* (2013.01); *B60R 25/302* (2013.01); *B60R 25/305* (2013.01); *H04W 4/029* (2018.02); *B60R 2025/1016* (2013.01); *B60R 2325/205* (2013.01)

(58) Field of Classification Search
None
See application file for complete search history.

(56) References Cited

FOREIGN PATENT DOCUMENTS

| DE | 102012223642 A1 | 6/2014 |
|---|---|---|
| DE | 102017213082 A1 * | 1/2019 |
| DE | 102017213082 A1 | 1/2019 |

(Continued)

OTHER PUBLICATIONS

German Search Report of related German Patent Application No. DE 102017220756 A1 dated Mar. 26, 2021.

*Primary Examiner* — Adolf Dsouza
(74) *Attorney, Agent, or Firm* — Brandon Hicks; Eversheds Sutherland (US) LLP (57) ABSTRACT

A system for increasing the security of road users. The system includes motor vehicles, each having a security device that can be activated by an activation signal associated with a security assistance request. The system includes a mobile communication device for transmitting position-data and a selected security assistance request. The system includes a control device for receiving the security assistance request and the acquired current position-data and for transmitting activation signals associated with the security assistance request to an assisting motor vehicle. The control device is configured to specify the one assisting motor vehicle also depending on the acquired current position-data and the security assistance request.

17 Claims, 7 Drawing Sheets

(51) Int. Cl.
*B60R 25/01* (2013.01)
*B60R 25/10* (2013.01)

(56) References Cited

FOREIGN PATENT DOCUMENTS

DE 102017220756 A1 * 5/2019
DE 102017220756 A1   5/2019

* cited by examiner

SYSTEM AND METHOD FOR INCREASING THE SECURITY OF ROAD USERS WITHOUT AN OWN MOTOR VEHICLE

CROSS-REFERENCE TO RELATED APPLICATIONS

This application claims priority to and the benefit of German patent application No. DE102020213084.1, filed Oct. 16, 2020, which is hereby incorporated by reference herein in its entirety.

FIELD

The invention relates to a system for increasing the security of road users without an own motor vehicle, to a suitable method for increasing the security of road users without an own motor vehicle, and to a computer program product.

BACKGROUND

Many people are anxious when moving through city streets, in particular at night. While road users sitting in their car feel protected in it, road users without an own motor vehicle, in particular pedestrians but also possibly cyclists, tend to feel unprotected and vulnerable when it is dark, or even in lonely districts in which there are no other people on the street who might help in an emergency or who would be witnesses. Insecurity is also heightened if there seems to be no potentially safe place of refuge available that could be sought in an emergency. It is often the case, however, that cars, i.e. motor vehicles, in particular parked motor vehicles, are in the vicinity.

DE 102017217876 B4 discloses an apparatus for improving the sense of space of a user. The apparatus has a position-acquisition system and sensors for acquiring information on the surrounding area. These are used to generate a spatially selective indicator signal containing information on the surrounding area. DE 102019122842 A1 discloses a navigation aid for the visually impaired that provides the user with route information and navigation aids. The navigation aid typically contains surround sensors and indicator facilities similar to those of vehicles, but provided, for instance, by means of a multifunction waistcoat that can be worn by the user. The road user without a motor vehicle can thus increase his security by means of improved information on the surrounding area, if he is prepared to carry the special equipment with him for this purpose.

DE 102017213082 A1 discloses a method for assisting a user, in which the user can make contact with parked vehicles via a wireless communication interface, and can activate there a vehicle function, in particular the lights. The pedestrian can thereby make use of functions of parked cars if vehicles with an appropriate interface are currently in the vicinity.

SUMMARY

The object of the present invention is to provide an improved facility that can be used to increase the security of a road user without a motor vehicle in a manner that can be selected by the road user, without the road user having to carry extensive paraphernalia for this purpose, or vehicles in the vicinity being equipped by chance with suitable security functions.

This object is achieved according to the invention by a system for increasing the security of road users without an own motor vehicle according to claim 1, by a method for increasing the security of road users without an own motor vehicle according to claim 19, and by a computer program product according to claim 20. The dependent claims define advantageous developments of the invention.

According to a first aspect of the invention, a system for increasing the security of road users without an own motor vehicle comprises a plurality of motor vehicles, each having at least one vehicle security device that can be activated by an activation signal associated with a security assistance request and that is connected to a wireless communication interface at least for receiving the associated activation signal, and comprises a mobile communication device that can be carried by a road user without an own motor vehicle and that has a wireless mobile communication interface and a position-data acquisition unit configured at least for continuous acquisition of its own current position-data, and for transmitting the acquired current position-data and at least one security assistance request selected from a plurality thereof, and also comprises a control device connected to a wireless control-signal interface at least for receiving the at least one selected security assistance request and the acquired current position-data and for transmitting activation signals associated with the at least one selected security assistance request to at least one assisting motor vehicle of the plurality of motor vehicles. Said control device is configured to specify the at least one assisting motor vehicle at least also depending on the acquired current position-data and the selected security assistance request.

Mobile security assistance requests for instance may relate to lighting the planned route, monitoring and recording the movement of the road user on his route, i.e. on his path of movement, to his destination, i.e. his destination position, but also monitoring the surrounding area around the road user, and, if applicable, warning if a suspicious movement is detected in a security zone around the road user, or providing, or guiding to, a safe place of refuge in the event of an acute safety emergency.

In this system, the road user without a motor vehicle merely has to have available the mobile communication device having wireless mobile communication interface and position-data acquisition unit, and be capable of notifying the control device which of the possible security assistances he wants to request. A mobile communication device of this type is preferably a mobile phone or smartphone or a tablet or other portable computer, and has a programmable device comprising processor and memory, in which memory are stored code segments, e.g. program code of an app, which when executed by the processor configure the mobile communication device to provide the stated functions. Said position-data acquisition unit may be in particular a receiver of a global position-data acquisition system (e.g. GPS).

For this purpose, the road user having the mobile communication device does not personally make contact with the motor vehicles in his surrounding area on the off-chance, but transmits his request wirelessly to a control device, which knows the motor vehicles, including their positions, in the surrounding area of the road user that provide at least one, if applicable also a plurality, of their vehicle security devices in such a manner that they can be activated via a wireless communication interface, so that the control device can specify therefrom selectively suitable motor vehicles as assisting motor vehicles, the vehicle security devices of which are activated according to the security assistance request selected by the road user. In order to make their position known, the motor vehicles of the system have, for example, their own position-data acquisition units, and are configured to acquire their position and transmit this position to the control device via their wireless communication interface.

In a preferred embodiment, the control device is provided via a Cloud service. The control device can thus be provided in any required size at a remote location, for instance at a central computing centre, as long as wireless communication is guaranteed between the wireless control-signal interface and the mobile communication device and the plurality of motor vehicles, for instance via a mobile communication network. The plurality of motor vehicles of the system, and the mobile communication device, are in this case designed to register with the Cloud service. The motor vehicles and mobile communication devices registered with the Cloud service preferably communicate with the control device in an encrypted manner.

In an embodiment of the system, the mobile communication device is also configured to transmit a destination position to the control device, and the control device is configured to identify an appropriate path of movement from the acquired current position to the destination position, and to specify the at least one assisting motor vehicle also depending on its distance from the path of movement. The control device can thus plan a route for the road user to the destination position, and identify an appropriate path of movement. The path of movement is appropriate primarily when it is possible for the road user to reach the destination position along the path of movement. For this purpose, the control device is configured, for instance, to analyse an electronic map, which is stored or available via a data network, of an electronic map service, and to determine the distances of the plurality of motor vehicles having known position data from the path of movement. The distance from the path of movement is in this case the shortest distance of the motor vehicle from a currently closest position on the path of movement. There is provision to activate the requested vehicle security device of the specified at least one assisting motor vehicle. When there are a plurality of assisting motor vehicles, an embodiment can provide activating all of these simultaneously until the road user having the mobile communication device has reached the destination position. In another embodiment, however, provision is made to activate and/or deactivate again the vehicle security devices of the assisting motor vehicles depending on the continuously updated acquired position-data. In yet another embodiment, provision is made to activate the relevant vehicle security device only once the acquired current position of the mobile communication device is less than a distance limit from the position of the associated vehicle. Provision can also be made to deactivate this again as soon as this, or alternatively another, distance limit is exceeded.

In a preferred exemplary embodiment, the control device is configured to identify as the appropriate path of movement, a path of movement for which the number of assisting motor vehicles is maximized within a specified distance from the path of movement. In other words, the path of movement is routed such that as many assisting motor vehicles as possible are available within a specified zone around the path of movement, so that, by the activation of the selected vehicle security device of said vehicles, the security of the road user without an own motor vehicle is increased as far as possible.

In a further exemplary embodiment, the control device is configured to access a database containing geographic security-risk information, and to identify as the appropriate path of movement, a path of movement for which a total security risk is minimized along the path of movement. Geographic security-risk information contains, for instance, a probability of becoming a victim of a crime or an accident as a road user without a motor vehicle in a particular street or district, which probability is based on statistics about earlier events and their locations. The database is preferably provided via a data service, which also updates the stored information. In addition to the objective increase in the security of the road user on his route along the path of movement to the destination position, knowing that the path of movement has been routed through an especially safe district also increases the subjective sense of security for the road user. One embodiment seeks both to maximize the number of assisting motor vehicles along the path of movement and to minimize the total security risk along the path of movement. This is done by weighting both influencing factors, for instance according to a significance of the total security risk measured from absolute cases and/or according to the absolute number of available assisting motor vehicles, for example in each case in relation to the length of the path of movement.

In a preferred embodiment, the control device is also configured to transmit to the mobile communication device the identified appropriate path of movement. This can be indicated here to the road user, for instance visually and/or audibly, in order that the road user can also follow the path of movement as precisely as possible. In other embodiments, the transmission of the path of movement can also be omitted, for instance if, along the path of movement, vehicle lights are meant to be activated, and vehicles assisting in this are available at distances apart that are short enough for the road user to be able to discern the identified path of movement just as easily.

This is because in one embodiment, the at least one activatable vehicle security device comprises vehicle lights of the motor vehicle concerned. Thus, depending on the number, position and orientation of the motor vehicles identified by the control device to be assisting motor vehicles, at least portions of the path of movement, preferably the entire path of movement, is lit by vehicle lights, with the result that, at least at night, the security of the road user along the route to his destination position is increased easily, and also the subjective sense of security is improved ("light-the-way function").

In a further embodiment, the at least one activatable vehicle security device comprises at least one in-vehicle surround-sensor unit, which is designed to detect moving objects in a surrounding area of the motor vehicle concerned, and to transmit information on detected moving objects to the control device. For this purpose, the wireless control-signal interface of the control device is also designed to receive this information. In-vehicle surround-sensor units may be, for example, radar or lidar sensor units, or even infrared camera units or camera units for visible light. The road user can then be informed about the detected moving objects so that he is warned and can himself recognize a potential danger. The fields of view of the various sensors preferably also include in particular zones that may not be visible to the road user himself, for instance between parked vehicles, etc. The fields of view of the surround sensors in addition also comprise zones behind the road user which would otherwise not be in the road user's view, thereby improving the security of the road user and also his sense of security ("watch-my-back function"). In the embodiment described, it is provided that the surround-sensor units are themselves equipped with a signal analysis function or are connected to a suitably configured analysis unit, in order to detect moving objects in the surround-sensor signals. Only a small amount of information is thereby transmitted to the control device, so that the transmission does not need a large-bandwidth connection. It can also be provided in another embodiment to transmit the surround-sensor signals to the control device so that this device performs the signal analysis and detects moving objects in the received surround-sensor signals. In a preferred embodiment, the control device is configured to perform the signal analysis itself as required, so that as few demands as possible are placed on the surround-sensor units of the individual motor vehicles, and thus as many motor vehicles as possible are eligible for use in the system.

In a preferred exemplary embodiment, the control device is configured to transmit to the mobile communication device the received information on detected moving objects or warning information if the received information on detected moving objects relates to a zone that overlaps a security zone around the current position of the mobile communication device. This ensures that the road user, i.e. the road user without an own motor vehicle, is made aware of suspicious movements as soon as they affect his security zone. The security zone should be selected such that it allows the road user sufficient reaction time to react to the detected movement before being reached by the moving object, for instance another person, who might be an attacker or mugger, an approaching large animal, or a vehicle on a collision course. The security zone may be circular or have a different shape. In one embodiment, the security zone comprises in particular a zone that does not lie in the field of vision of the road user.

In one embodiment, the at least one activatable vehicle security device comprises an in-vehicle camera unit of the motor vehicle concerned, which is configured to start recording a video at the latest when the acquired current position of the at least one mobile communication device enters a field of view of the in-vehicle camera unit, and to end the recording at the earliest when the acquired current position no longer lies in the field of view. A sequence of video recordings can thereby be created of the movement of the road user along the path of movement, and can be used as evidence, for instance, if problems arise, for example in the event of a mugging. In addition, knowing that a video is possibly being recorded can act as a deterrent, thereby increasing the security of the road user ("guardian angel function").

Different embodiments can be combined with each other. In particular, there can also be provision to send a plurality of security requests simultaneously in order to activate a plurality of vehicle security devices simultaneously. For example, provision can be made to use during darkness the "guardian angel function" and the "light-the-way function" simultaneously.

In an exemplary embodiment, the motor vehicle concerned is configured to transmit the recorded video to the control device, and the control device is configured to store the recorded video. This has the advantage that all the videos relating to the same path of movement can be stored jointly in one location and not, if applicable, distributed across different motor vehicles. The transmission is preferably performed in an encrypted manner. Alternatively, the videos are each stored in the respective motor vehicles, with information on the storage sent to the control device. In both cases, in a preferred embodiment, the videos are stored using encryption, which can be decrypted again only by a key known solely to a security agency.

In a preferred exemplary embodiment, the control device is also configured to delete the stored recorded video when the acquired current position of the mobile communication device coincides with the destination position, i.e. when the road user has reached his destination. This avoids personal image data being stored for an unnecessarily long time without reason. It can be provided in one embodiment to delay the automatic deletion if the destination position was indeed reached, but only after an unexpectedly long time interval, where an expected time interval depends in particular on the length of the path of movement.

In one embodiment, the control device is configured to transmit a message to a security agency if the current position does not coincide with the destination position within a time interval that depends on a length of the identified path of movement and a rate of change in the acquired current position of the mobile communication device. In particular, the security agency may be the police. The message may contain an emergency alert and the exact position and time of day. If a video recording exists, this recording itself or a reference to its existence and how it can be retrieved from the control device can also be transferred to the security agency. In one embodiment, in which the mobile communication device comprises a telephone function, preferably also the phone number thereof is also transferred so that the security agency can perform a callback.

In a further embodiment, the at least one activatable vehicle security device of the motor vehicle concerned of the system comprises a door lock of the motor vehicle concerned, which door lock opens in response to the activation signal being received, and the control device is configured to specify as the assisting motor vehicle, on receiving an emergency access request transmitted as the security assistance request from the mobile communication device, the motor vehicle whose position is closest to the current position of the mobile communication device. Since the control device transmits to the assisting motor vehicle the activation signal associated with the emergency access request, the door lock is unlocked in the assisting motor vehicle closest to the acquired current position of the road user without an own motor vehicle, so that this motor vehicle is available as an emergency place of refuge. This "refuge function" can be used in particular in an acute danger situation posed by other people or dangerous animals, but also, for instance, in an acute medical or weather-related emergency.

In a preferred exemplary embodiment, the control device is also configured to transmit the position of the specified assisting motor vehicle to the mobile communication device. The road user seeking refuge can thereby locate the assisting motor vehicle with unlocked door as quickly as possible.

In a further exemplary embodiment, the specified assisting motor vehicle is configured to emit, on receiving the activation signal, visual and/or audible signals. The road user seeking refuge can hence locate the assisting motor vehicle particularly quickly. The audible and/or visual signals are also used not only to deter an approaching menacing person or even a menacing animal but also to alert anyone who may be passing to the menacing situation. In a particularly preferred embodiment, the unlocking of the door and/or the output of audible and/or visual signals does not take place until it is found from a check of the acquired current position of the road user having the mobile communication device and the position of the assisting motor vehicle to be unlocked that a distance is less than a preset value.

In a preferred exemplary embodiment, the specified assisting motor vehicle is also configured to establish a communication link to a security agency, for instance the police, after receiving the activation signal. The road user who has found refuge in the specified assisting motor vehicle can therefore not just lock the doors from the inside and hope for help but immediately has the facility to request help. It can also be provided to start automatically a video recording by an in-vehicle camera in order to secure visual evidence.

In one embodiment of the system, the mobile communication device or the control device is designed to initiate remuneration of the at least one assisting motor vehicle. It can thereby be achieved in particular that the system is provided with more motor vehicles, and that costs incurred for energy consumption and, if applicable, wear, can be borne by the originator, i.e. the road user without an own motor vehicle. For the purpose of remuneration, the system can provide the use of a blockchain-based cryptocurrency, for instance Bitcoin or a variant thereof. This allows secure transactions with a distributed accounting system independently of different currencies and exchange rates, and without the involvement of banks or other third parties.

According to a second aspect of the invention, a method for increasing the security of road users without an own motor vehicle using a system according to the first aspect of the invention comprises a step of providing a plurality of motor vehicles, each having at least one vehicle security device that can be activated by an activation signal associated with a security assistance request and that is connected to a wireless communication interface at least for receiving the associated activation signal, and a step of providing a mobile communication device that can be carried by a road user without an own motor vehicle and that has a wireless mobile communication interface and a position-data acquisition unit, and a step of providing a control device connected to a wireless control-signal interface. In addition, the method provides for the mobile communication device continuously acquiring its own current position-data and transmitting to the control device the acquired current position-data and at least one security assistance request selected from a plurality thereof, and the control device receiving the at least one selected security assistance request and the acquired current position-data, specifying at least one assisting motor vehicle from the plurality of motor vehicles at least also depending on the acquired current position-data and the selected security assistance request, and transmitting to the at least one assisting motor vehicle, activation signals associated with the at least one selected security assistance request, and also the at least one assisting motor vehicle receiving the associated activation signals and activating the at least one vehicle security device that can be activated thereby. Hence the advantages and particular features of the system according to the invention for increasing the security of road users without an own motor vehicle, including the embodiments thereof, are also implemented in a suitable operating method.

At least part of the method is preferably computer-implemented. Hence, for example, the functionality of the control device is then realised by a programmable device at least comprising a processor and a memory, which memory contains code segments, i.e. program code, of a computer program product, which when they are loaded from the memory into the processor and executed by said processor, cause the programmable device to provide the functionality of the control device. The same applies to the functionality of the mobile communication device, which has a programmable device, and to the plurality of motor vehicles. According to a third aspect of the invention, a computer program product therefore comprises code segments which, when loaded from one or more memories into one or more processors of one or more programmable devices of a system for increasing the security of road users without an own motor vehicle, configure these to perform a method according to the second aspect of the invention. A (non-volatile) computer-readable storage medium preferably comprises the code segments of the computer program product according to the third aspect of the invention. Hence the advantages and particular features of the system according to the invention for increasing the security of road users without an own motor vehicle, including the embodiments thereof, are also implemented in a computer program product for configuring the system.

BRIEF DESCRIPTION OF THE DRAWINGS

Further advantages of the present invention will become apparent from the detailed description and the figures. The invention is also explained in greater detail below in conjunction with the following description of exemplary embodiments with reference to the accompanying figures, in which.

In the figures, identical or similar elements are denoted by the same reference signs where appropriate.

DETAILED DESCRIPTION

It goes without saying that other embodiments can be used and structural or logical modifications can be made without departing from the scope of protection of the present invention. It goes without saying that the features of the various exemplary embodiments described above and below can be combined with one another unless specifically stated otherwise. Therefore the description should not be considered in a restrictive sense, and the scope of protection of the present invention is defined by the accompanying claims.

Figure 1:
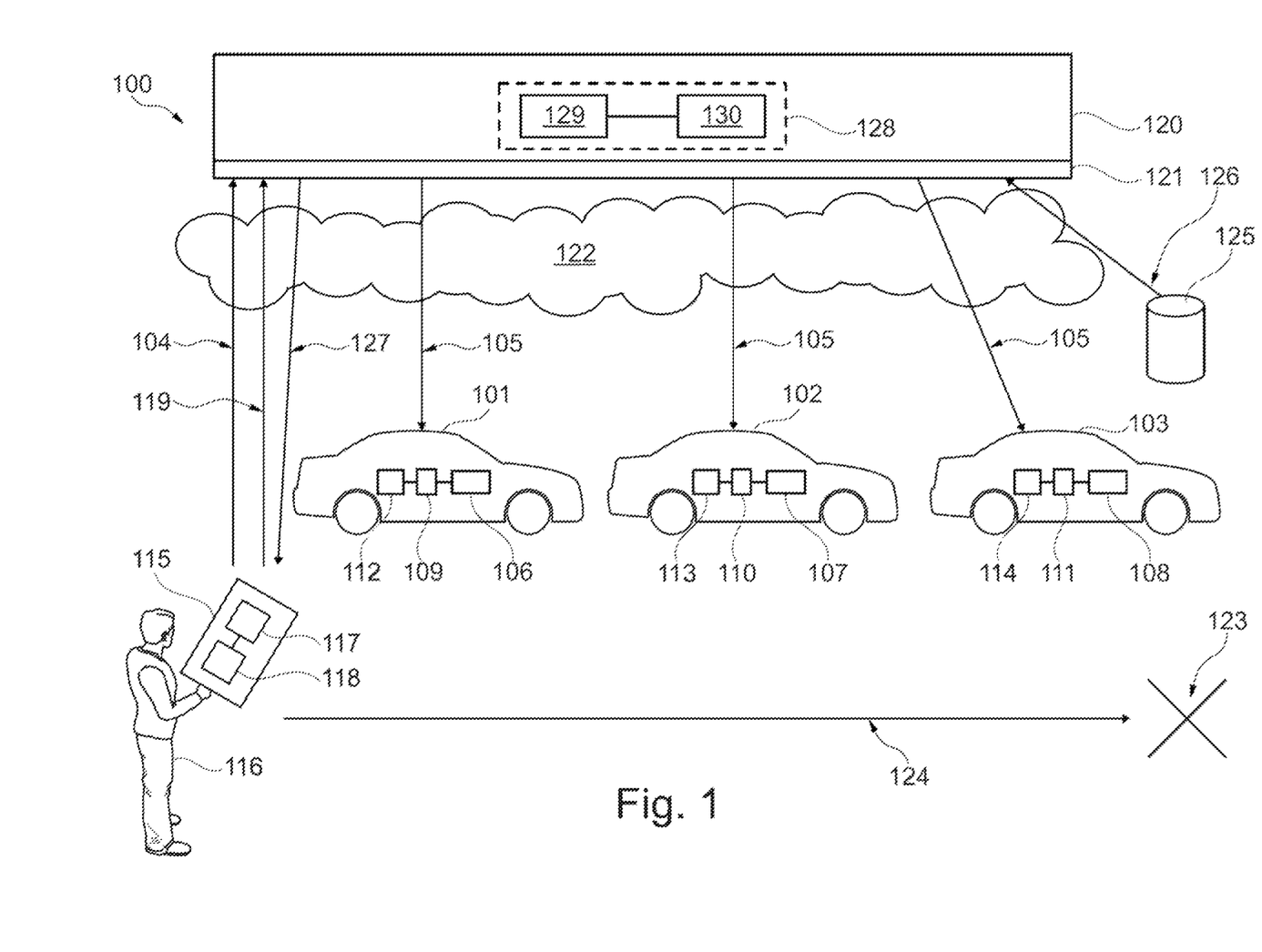
FIG. 1 shows in a schematic diagram an example of a system for increasing the security of road users without an own motor vehicle according to an embodiment of the invention.

FIG. 1 shows in a schematic diagram an example of a system 100 for increasing the security of road users without an own motor vehicle according to an embodiment of the invention. The system 100 comprises a plurality of motor vehicles 101, 102, 103, in this case parked motor vehicles, each having at least one vehicle security device 106, 107, 108 that can be activated by an activation signal 105 associated with a security assistance request 104 and that is connected to a wireless communication interface 109, 110, 111, which can be used to receive the associated activation signal 105. The positions of each of the motor vehicles 101, 102, 103 are known, for instance by remote locating of the wireless communication interface. In preferred embodiments, the motor vehicles 101, 102, 103 each have a dedicated position-data determination unit 112, 113, 114, which are receivers in a global position-data identification system, for instance GPS receivers. In addition, the system 100 comprises a mobile communication device 115, for instance a smartphone, which is carried by a road user 116 without an own motor vehicle, for example a pedestrian or a cyclist. The system 100 can also comprise more than one mobile communication device 115 carried by additional road users without a motor vehicle. The mobile communication device has a wireless mobile communication interface 117 and a position-data acquisition unit 118 so that the current position-data 119 specific to the mobile communication device 115, and hence to the road user 116 carrying said device, can be acquired and sent to the control device 120 continuously or at regular intervals. The mobile communication device 115 is also designed, for instance programmed by an app, for the road user 116 to be able to select at least one security assistance request from a plurality thereof, wherein the at least one selected security assistance request 104 is transferred, in other words sent, i.e. transmitted, to the control device 120. The control device 120 is connected to, or has available, a wireless control-signal interface 121 for receiving and transmitting signals, in particular for receiving the at least one selected security assistance request 104 and the acquired current position-data 119, and for transmitting activation signals 105 associated with the at least one selected security assistance request 104 to at least one assisting motor vehicle of the plurality of motor vehicles 101, 102, 103. In FIG. 1, all the motor vehicles 101, 102, 103 shown are selected as assisting motor vehicles. In the embodiment shown, the control device 120 is provided by means of a Cloud service 122. The control device 120 decides which of the motor vehicles 101, 102, 103 of the system 100 is specified, i.e. selected, as the assisting motor vehicle(s). The decision is made here also depending on the acquired current position-data 119 for the mobile communication device 115 and on the selected security assistance request 104. In the embodiment shown, the mobile communication device 115 transmits a destination position 123 that the road user 116 wants to reach. The control device 120 is designed to identify an appropriate path of movement 124 to the destination position 123, and, on the basis of a criterion, for instance the distance of each of the motor vehicles 101, 102, 103 from the path of movement 124, to specify which of the motor vehicles 101, 102, 103 shall be assisting motor vehicles, the vehicle security devices 106, 107, 108 of which are activated. In order to identify the path of movement 124, it is also provided in the embodiment shown, to retrieve from a database 125 geographic security information 126, and to identify as the path of movement 124 a path for which a total security risk is minimized along the path of movement. The control device 120 then transmits to the mobile communication device 115 information 127 on the identified appropriate path of movement. In order to be able to perform the described functions, the control device 120 has a programmable device 128 equipped with a processor 129 and a memory 130, in which are stored code segments which, when loaded and executed by the processor 129, configure the programmable device 128 to provide the functionalities of the control device 120.

Figure 2A:
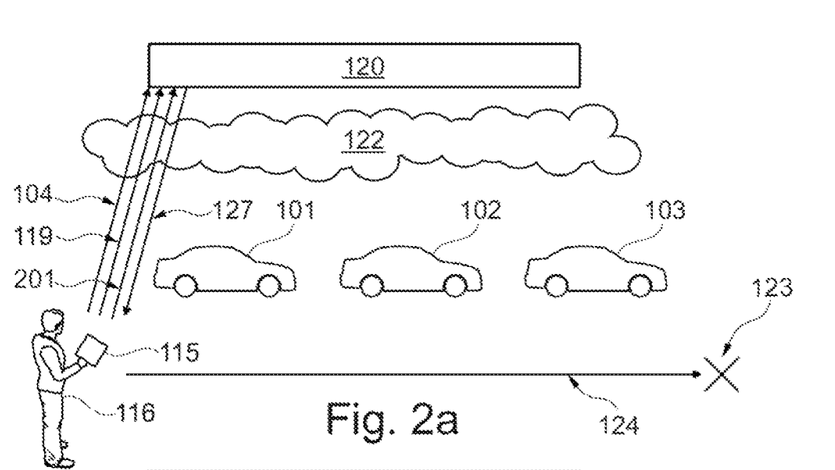
FIG. 2a-2c show in a schematic diagram an example of phases of operation of a system for increasing the security of road users without an own motor vehicle in a light-the-way mode according to a further embodiment of the invention.

FIG. 2*a*-*c* show in a schematic diagram an example of phases of operation of a system for increasing the security of road users without an own motor vehicle in a light-the-way mode according to a further embodiment of the invention. In the example shown in FIG. 2*a*, the road user 116 without an own motor vehicle is a pedestrian who is in a street at night in which there are no other passers-by. He is carrying the mobile communication device 115, which by the installation of a suitable computer program product, e.g. a suitable app, is configured to connect by means of the Cloud service 122 to the control device 120 via its wireless control interface. The road user operates the app and selects "light-the-way" operation as the required security assistance. The mobile communication device 115 transmits the selection as a security assistance request 104 to the control device 120. In addition, the current position-data 119 for the mobile communication device 115 is acquired, and information 201 on the destination position 123 that the road user 116 wants to reach is acquired via the app and transmitted, i.e. sent, to the control device 120. The control device 120 identifies the appropriate path of movement 124 according to settings, for example the shortest path, or the path containing the most parked motor vehicles belonging to the system along the path of movement 124 to the destination position 123, and transmits to the mobile communication device 115 the information 127 on the appropriate path of movement 124.

Figure 2B:
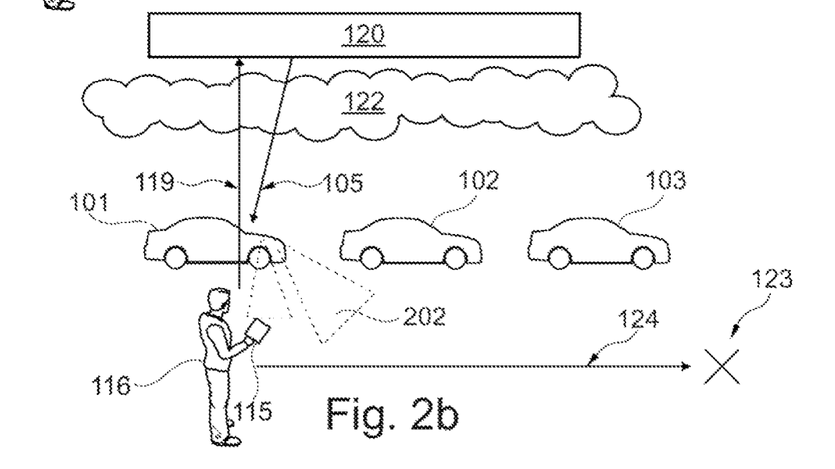

In the phase shown in FIG. 2*b*, the road user 116 moves along the path of movement 124, along which the three motor vehicles 101, 102, 103 are parked. The mobile communication device 115 sends continuously updated the acquired current position-data 119 to the control device 120. This device ascertains the proximity to the first motor vehicle 101, specifies this vehicle as the assisting motor vehicle and transmits to this vehicle the activation signal 105, which in this operating mode causes activation of the vehicle lights of the first motor vehicle 101, so that the light beam 202 thereof lights a segment along the path of movement 124.

Figure 2C:
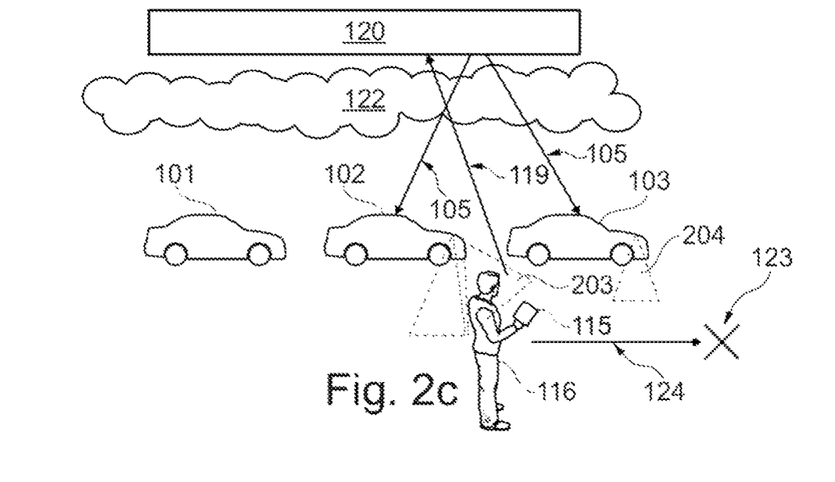

In the phase shown in FIG. 2*c*, the road user 116 has travelled further along the path of movement 124 and is now between the second motor vehicle 102 and the third motor vehicle 103. The carried mobile communication device 115 continues to send the currently acquired current position-data 119 to the control device 120. This device selects the second and third motor vehicles 102, 103 as assisting motor vehicles and sends the activation signal 105 to each of these vehicles so that the vehicle lights thereof are switched on and further segments of the path of movement 124 are lit by the light beams 203, 204 of said lights.

The light-the-way operation ends when the road user 116 reaches the destination position 123. It can also be provided to transmit to the motor vehicles 101, 102, 103 the acquired current position-data 119 together with the activation signal 105, so that these vehicles do not activate the respective vehicle lights until the road user 116 is within a certain distance of the motor vehicle concerned.

FIG. 3*a*-*f* show in a schematic diagram an example of phases of operation of a system for increasing the security of road users without an own motor vehicle in a guardian-angel mode according to a further embodiment of the invention. In the example shown in FIG. 3*a*, the road user 116 without an own motor vehicle is again a pedestrian who is in a street in which there are no other passers-by. He is carrying the mobile communication device 115, which by the installation of a suitable computer program product, e.g. a suitable app, is configured to connect by means of the Cloud service 122 to the control device 120. The road user 116 operates the app and selects "guardian angel" operation as the required security assistance. The mobile communication device 115 transmits the selection as a security assistance request 104 to the control device 120. In addition, the current position-data 119 for the mobile communication device 115 is acquired, and information 201 on the destination position 123 that the road user 116 wants to reach is acquired via the app and transmitted to the control device 120. The control device 120 identifies the appropriate path of movement 124 according to settings, for example the shortest path, or the path containing the most parked motor vehicles belonging to the system along the path of movement 124 to the destination position 123, and transmits to the mobile communication device 115 the information 127 on the appropriate path of movement 124.

Figure 3A:
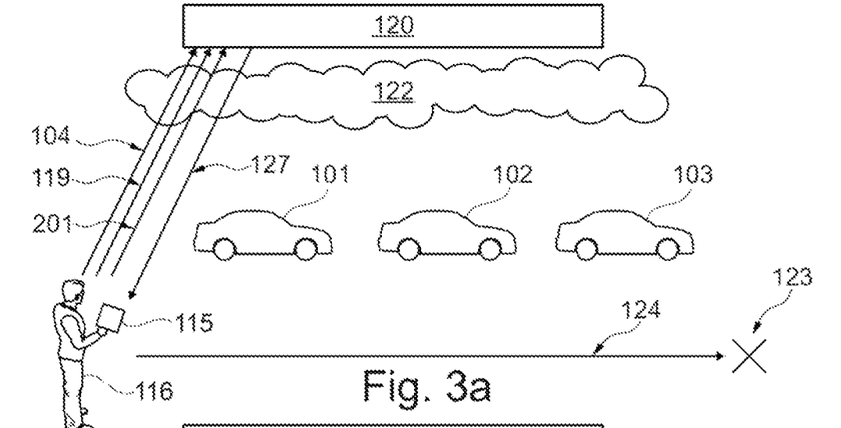
FIG. 3a-3f show in a schematic diagram an example of phases of operation of a system for increasing the security of road users without an own motor vehicle in a guardian-angel mode according to a further embodiment of the invention.
Figure 3B:
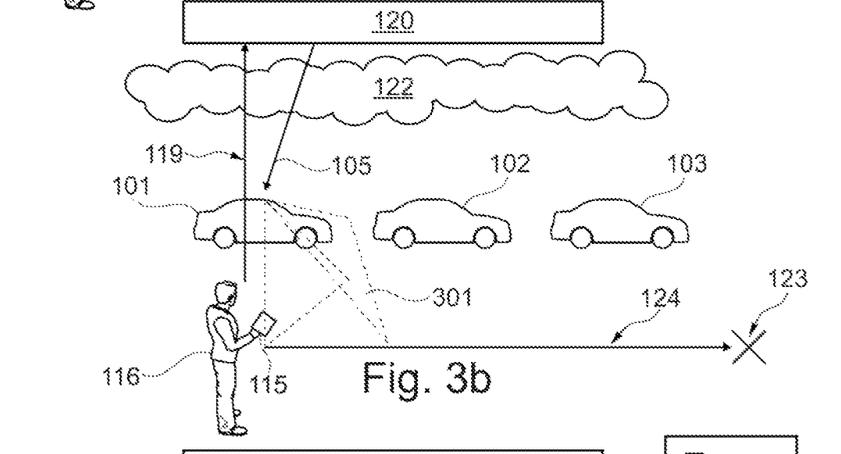

In the phase shown in FIG. 3b, the road user 116 moves along the path of movement 124, along which the three motor vehicles 101, 102, 103 are parked. The mobile communication device 115 sends continuously updated the acquired current position-data 119 to the control device 120. This ascertains the proximity to the first motor vehicle 101, specifies this vehicle as the assisting motor vehicle and transmits to this vehicle the activation signal 105, which in this operating mode causes activation of in-vehicle video cameras of the first motor vehicle 101, so that the field of view 301 thereof includes a segment along the path of movement 124, and the video cameras of the first motor vehicle 101 film the road user 116 on his way through the segment. Initially, the video recording can be stored locally by the video camera.

Figure 3C:
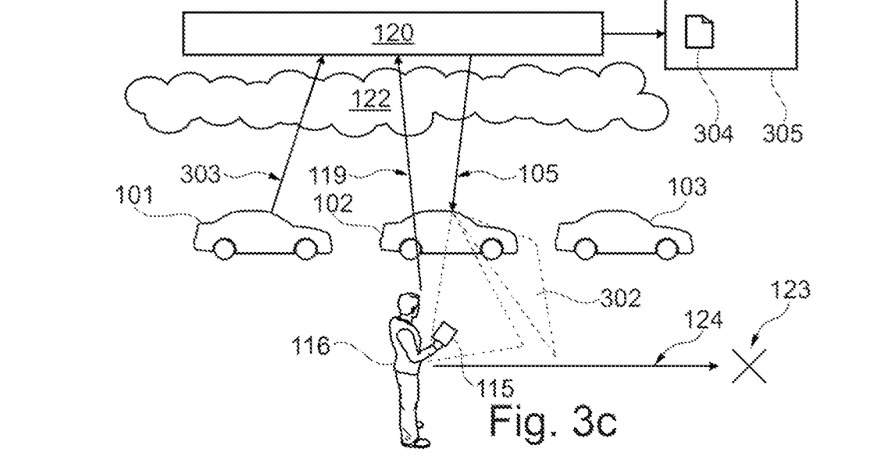

In the phase shown in FIG. 3c, the road user 116 has travelled further along the path of movement 124 and is now in the vicinity of the second motor vehicle 102 in one of the fields of view. The carried mobile communication device 115 continues to send the currently acquired current position-data 119 to the control device 120. This selects the second motor vehicle 102 as the assisting motor vehicle and sends the activation signal 105 to this vehicle so that the in-vehicle video cameras thereof are switched on and the field of view 302 of said video cameras includes a further segment of the path of movement 124, and the video cameras of the second motor vehicle 102 film the road user 116 on his way through this segment. Initially, the video recording can be stored locally by the video camera. As soon as the road user 116 is again outside the field of view 301 of the video cameras of the first motor vehicle 101, the video recording by said video cameras is stopped, and an encrypted transfer 303 of the first video recording 304 made by the in-vehicle video cameras of the first motor vehicle 101 is made to the control device 120, which stores the first video recording 304 in encrypted form in a memory 305.

Figure 3D:
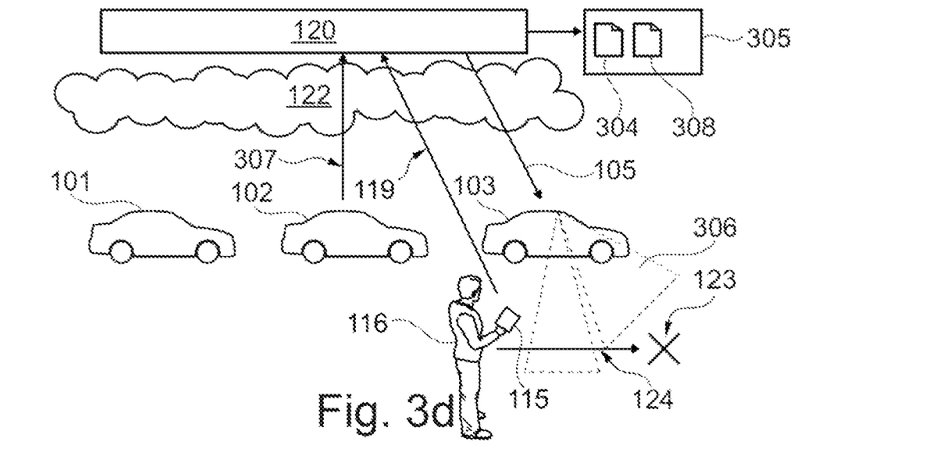

In the phase shown in FIG. 3d, the road user 116 has travelled still further along the path of movement 124 and is now in the vicinity of the third motor vehicle 103. The carried mobile communication device 115 continues to send the currently acquired current position-data 119 to the control device 120. This selects the third motor vehicle 103 as the assisting motor vehicle and sends the activation signal 105 to this vehicle so that the in-vehicle video cameras thereof are switched on and the field of view 306 of said video cameras includes a further segment of the path of movement 124, and the video cameras of the third motor vehicle 103 film the road user 116 on his way through this segment. Initially, the video recording can be stored locally by the video camera. As soon as the road user 116 is again outside the field of view 302 of the video cameras of the second motor vehicle 101, the video recording by said video cameras is stopped, and an encrypted transfer 307 of the second video recording 308 made by the in-vehicle video cameras of the second motor vehicle 102 is made to the control device 120, which stores the second video recording 308 in encrypted form in the memory 305. It can also be provided to transmit to the motor vehicles 101, 102, 103 the acquired current position-data 119 together with the activation signal 105, so that these vehicles do not activate the respective video cameras until the road user 116 is within a certain distance of the motor vehicle concerned.

Figure 3E:
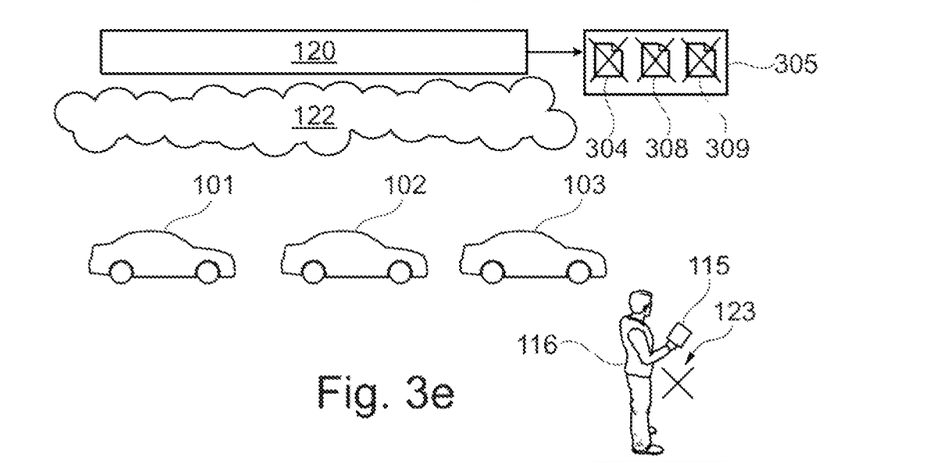

In the phase shown in FIG. 3e, the road user 116 has reached the destination position 123. Before this, when the field of view 306 of the video cameras of the third motor vehicle 103 was exited, a third video recording 309 was transmitted in an encrypted manner to the control device 120 and stored in encrypted form in the memory 305. On the destination position 123 being reached, the recorded route is completed successfully and the control device 120 deletes the captured video recordings from the memory 305.

Figure 3F:
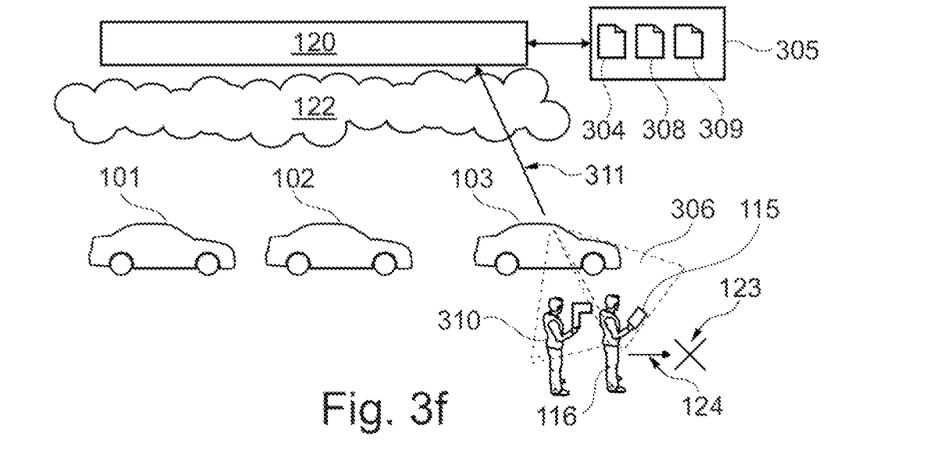

In the phase shown in FIG. 3f, which can occur as an alternative to the phase shown in FIG. 3e, the road user 116 does not reach the destination position 123, or not within a time limit, in the example shown because of a mugging by another person 310. This action takes place in the field of view 306 of the video cameras of the third motor vehicle 103. An encrypted transfer 311 of the third video recording from the in-vehicle video cameras of the third motor vehicle 103 is made to the control device 120, which stores the third video recording 309 in the memory 305. Since the recorded route of the road user 116 was not completed successfully at the destination position 123, the control device 120 contacts a security agency, for instance the police, in a predetermined manner, and grants the security agency access to the first, second and third video recordings 304, 308, 309. These are not deleted. It is provided that the control device 120 has encrypted the video recordings in such a way that they can be decrypted only by a key known solely to the security agency.

Figure 4A:
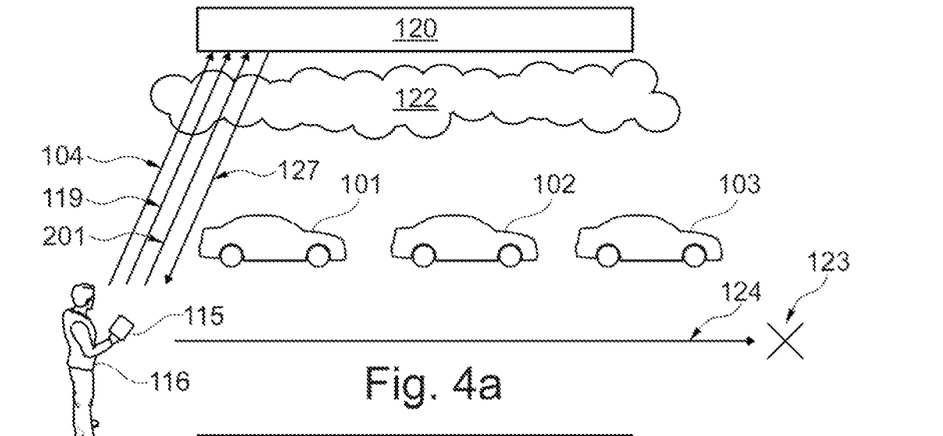
FIG. 4a-4c show in a schematic diagram an example of phases of operation of a system for increasing the security of road users without an own motor vehicle in a watch-my-back mode according to a further embodiment of the invention.

FIG. 4a-c show in a schematic diagram an example of phases of operation of a system for increasing the security of road users without an own motor vehicle in a watch-my-back mode according to a further embodiment of the invention. In the example shown in FIG. 4a, the road user 116 without an own motor vehicle is again a pedestrian who is in a street at night in which there are no other passers-by. He is carrying the mobile communication device 115, which by the installation of a suitable computer program product, e.g. a suitable app, is configured to connect by means of the Cloud service 122 to the control device 120. The road user 116 operates the app and selects "watch-my-back" operation as the required security assistance. The mobile communication device 115 transmits the selection as a security assistance request 104 to the control device 120. In addition, the current position-data 119 for the mobile communication device 115 is acquired, and information 201 on the destination position 123 that the road user 116 wants to reach is acquired via the app and transmitted to the control device. The control device 120 identifies the appropriate path of movement 124 according to settings, for example the shortest path, or the path containing the most parked motor vehicles belonging to the system along the path of movement 124 to the destination position 123, and transmits to the mobile communication device 115 the information 127 on the appropriate path of movement 124.

Figure 4B:
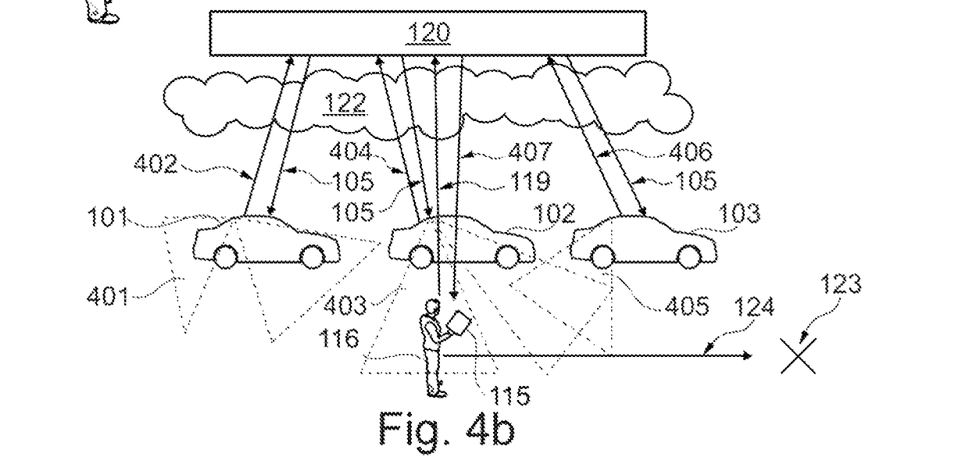

In the phase shown in FIG. 4*b*, the mobile communication device 115 transmits the acquired current position 119 to the control device 120. This identifies that the first, second and third motor vehicles 101, 102, 103 are eligible as assisting motor vehicles in the vicinity, and sends the activation signal 105 to each of these vehicles, which in "watch-by-back operation" causes the assisting motor vehicles to activate their in-vehicle surround sensors, for instance radar and lidar sensors, in order to detect moving objects, in particular other people, in their detection zones. The acquired current position of the road user 116 is preferably also transmitted together with the activation signal 105 in order that this road user can be distinguished in the detection from any other people who may be detected. The first motor vehicle 101 checks whether a moving object is detected in the detection zone 401 of the surround sensors of the first motor vehicle, and sends associated first sensor signals 402 to the control device 120. The second motor vehicle 102 checks whether a moving object is detected in the detection zone 403 of the surround sensors of the second motor vehicle 102, and sends associated second sensor signals 404 to the control device 120. The third motor vehicle 103 checks whether a moving object is detected in the detection zone 405 of the surround sensors of the third motor vehicle 103, and sends associated third sensor signals 406 to the control device 120. The control device 120 combines the sensor signals from the individual detection zones, and transmits a current detection result 407 to the mobile communication device 115, in this case without a warning, because no moving objects were detected.

Figure 4C:
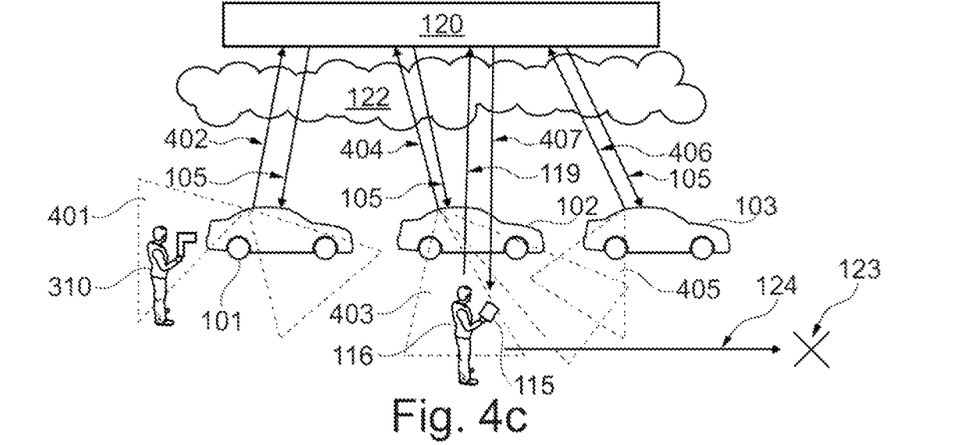

Also in the phase shown in FIG. 4*c*, the mobile communication device 115 transmits the acquired current position 119 to the control device 120. This identifies that the first, second and third motor vehicles 101, 102, 103 are eligible as assisting motor vehicles in the vicinity, and sends the activation signal 105 to each of these vehicles, which in "watch-by-back operation" causes the assisting motor vehicles to activate their in-vehicle surround sensors, in order to detect moving objects in their detection zones. The first motor vehicle 101 checks whether a moving object is detected in the detection zone 401 of the surround sensors of the first motor vehicle, and detects there another person 310, and sends associated first sensor signals 402 to the control device 120. The second motor vehicle 102 checks whether a moving object is detected in the detection zone 403 of the surround sensors of the second motor vehicle (which is not the case), and sends associated second sensor signals 404 to the control device 120. The third motor vehicle 103 checks whether a moving object is detected in the detection zone 405 of the surround sensors of the third motor vehicle (which is not the case), and sends associated third sensor signals 406 to the control device 120. The control device combines the sensor signals from the individual detection zones, and transmits a current detection result 407 to the mobile communication device 115, together with a visual or audible warning that another person 310 was detected who is getting closer and where this person is located.

Figure 5A:
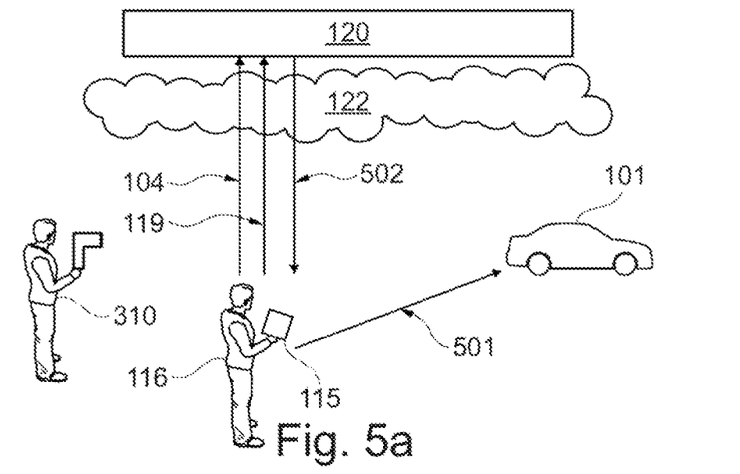
FIG. 5a-5c show in a schematic diagram an example of phases of operation of a system for increasing the security of road users without an own motor vehicle in a refuge mode according to a further embodiment of the invention.

FIG. 5*a-c* show in a schematic diagram an example of phases of operation of a system for increasing the security of road users without an own motor vehicle in a refuge mode according to a further embodiment of the invention. In the example shown in FIG. 5*a*, the road user 116 without an own motor vehicle is a pedestrian who is in a lonely district. He is carrying the mobile communication device 115, which by the installation of a suitable computer program product, e.g. a suitable app, is configured to connect by means of the Cloud service 122 to the control device 120. The road user 116 operates the app and selects "refuge" mode as the required security assistance, because another person 310, who is perceived as menacing, (or even a wild animal, for instance) is within sight. The mobile communication device 115 transmits the selection as a security assistance request 104 to the control device 120. In addition, the current position data 119 for the mobile communication device 115 is acquired and transmitted to the control device 120. The control device 120 identifies the motor vehicle 101 parked closest to the position of the road user 116, an appropriate shortest path of movement 501 for refuge, i.e. to the motor vehicle 101, and transmits to the mobile communication device 115 information 502 on the shortest path of movement 501.

Figure 5B:
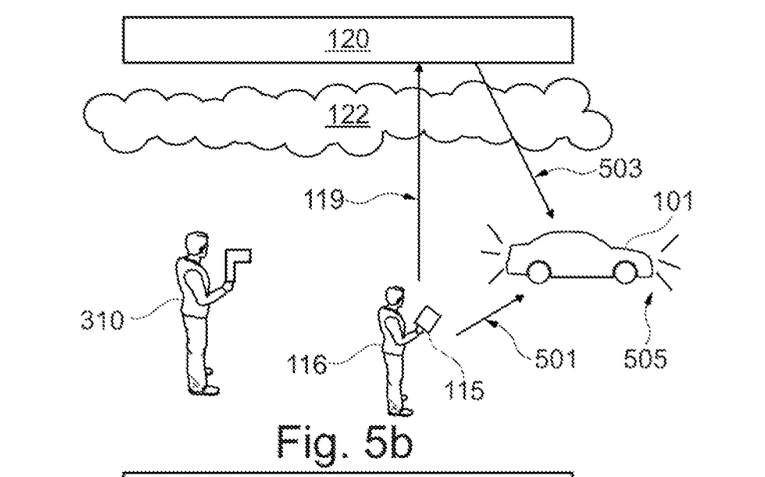

In the phase shown in FIG. 5*b*, the road user 116 has approached the motor vehicle 101 along the shortest path of movement 501. The current position data 119 for the mobile communication device 115 continues to be acquired and transmitted continuously to the control device 120. Since in the phase shown, the distance to the motor vehicle 101 has reached below a first threshold value, the control device 120 sends a first activation signal 503 to the motor vehicle 101, which causes this vehicle to activate the vehicle lights, indicator lights 505 and the horn of the motor vehicle in order both to make the road user 116 aware of the motor vehicle 101 and to deter the other person 310.

Figure 5C:
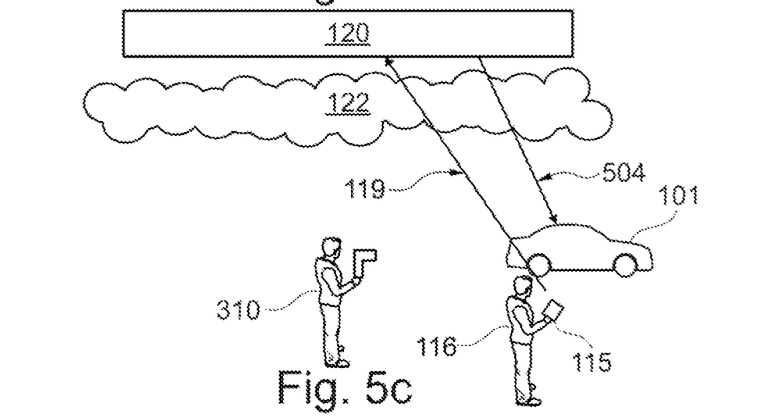

In the phase shown in FIG. 5*c*, the road user 116 has reached the motor vehicle 101. The current position data 119 for the mobile communication device 115 continues to be acquired and transmitted continuously to the control device 120. Since in the phase shown, the distance to the motor vehicle 101 has reached below a second threshold value, the control device 120 sends a second activation signal 504 to the motor vehicle 101, causing it to unlock the doors. The road user 116 can now get into the motor vehicle 101 and lock the doors from inside in order to protect himself from the other person 310. It can also be provided to establish a connection to a security agency in order to call for help.

Figure 6:
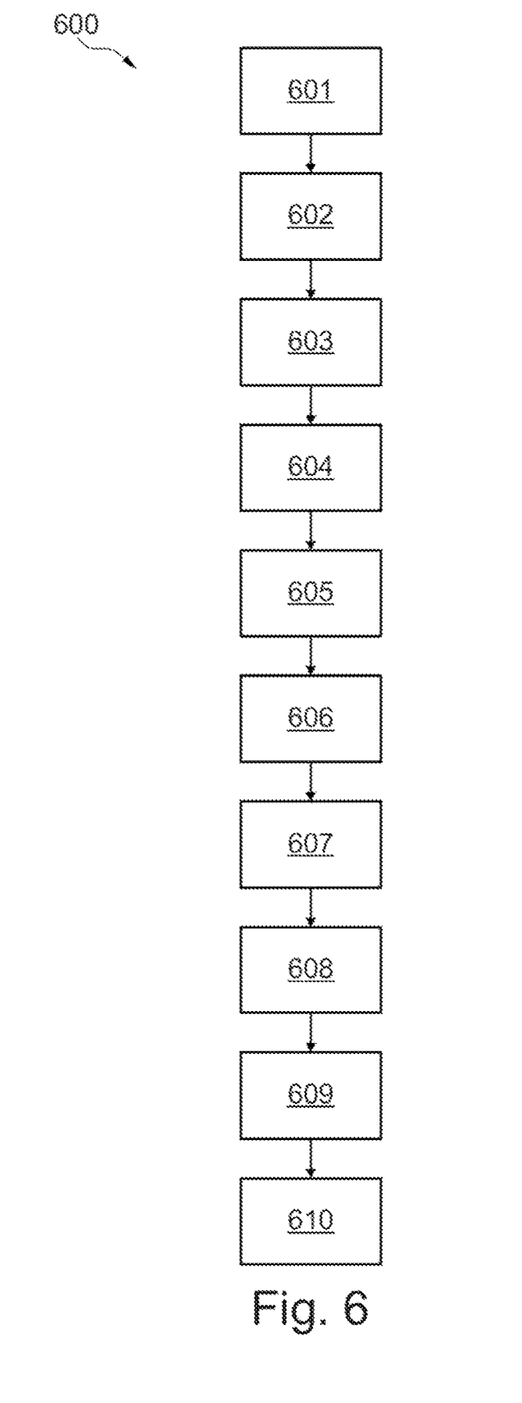
FIG. 6 shows in a schematic diagram an example of a method for increasing the security of road users without an own motor vehicle according to yet another embodiment of the invention.

FIG. 6 shows in a schematic diagram an example of a method for increasing the security of road users without an own motor vehicle according to yet another embodiment of the invention. The method 600 for increasing the security of road users without an own motor vehicle starts with a step of providing 601 a plurality of motor vehicles, each having at least one vehicle security device that can be activated by an activation signal associated with a security assistance request and that is connected to a wireless communication interface at least for receiving the associated activation signal. A step of providing 602 a mobile communication device that can be carried by a road user without an own motor vehicle and that has a wireless mobile communication interface and a position-data acquisition unit, and a step of providing 603 a control device connected to a wireless control-signal interface are also performed. In addition, the method provides for the mobile communication device continuously acquiring 604 its own current position-data and transmitting 605 to the control device the acquired current position-data and at least one security assistance request selected from a plurality thereof, and the control device receiving 606 the at least one selected security assistance request and the acquired current position-data, specifying 607 at least one assisting motor vehicle from the plurality of motor vehicles at least also depending on the acquired current position-data and the selected security assistance request, and transmitting 608 to the at least one assisting motor vehicle, activation signals associated with the at least one selected security assistance request, and in addition the at least one assisting motor vehicle receiving 609 the associated activation signals and activating 610 the at least one vehicle security device that can be activated thereby.

It goes without saying that although method steps have been described in a certain order, some could be performed in a different order from that described here. It also goes without saying that certain steps can be carried out simultaneously or sequentially, once or multiple times, that other steps could be added or that certain steps described here could be omitted. In other words, the present descriptions are provided for the purpose of illustrating specific embodiments and should not be regarded as limiting the disclosed subject matter.

The "and/or" expression used here, when employed in a series of two or more elements, means that each of the elements mentioned can be used alone, or any combination of two or more of the elements mentioned can be used. For example, if a conjunction is described as containing the components A, B and/or C, the conjunction can contain A alone, B alone, C alone, A and B in combination, A and C in combination, B and C in combination or A, B and C in combination.

LIST OF REFERENCE SIGNS

100 system for increasing the security of road users without an own motor vehicle
101 motor vehicle
102 motor vehicle
103 motor vehicle
104 security assistance request
105 activation signal
106 vehicle security device
107 vehicle security device
108 vehicle security device
109 wireless communication interface
110 wireless communication interface
111 wireless communication interface
112 position-data determination unit
113 position-data determination unit
114 position-data determination unit
115 mobile communication device
116 road user without an own motor vehicle
117 wireless mobile communication interface
118 position-data acquisition unit
119 acquired current position-data
120 control device
121 wireless control-signal interface
122 Cloud service
123 destination position
124 path of movement
125 database
126 geographic security information
127 information on the identified appropriate path of movement
128 programmable device
129 processor
130 memory
201 information on the destination position
202 light beam of the vehicle lights of the first motor vehicle
203 light beam of the vehicle lights of the second motor vehicle
204 light beam of the vehicle lights of the third motor vehicle
301 field of view of the video cameras of the first motor vehicle
302 field of view of the video cameras of the second motor vehicle
303 encrypted transfer of the first video recording made by the in-vehicle video cameras of the first motor vehicle
304 first video recording
305 memory
306 field of view of the video cameras of the third motor vehicle
307 encrypted transfer of the second video recording made by the in-vehicle video cameras of the second motor vehicle
308 second video recording
309 third video recording
310 other person
311 encrypted transfer of the third video recording made by the in-vehicle video cameras of the third motor vehicle
401 detection zone of the surround sensors of the first motor vehicle
402 first sensor signals
403 detection zone of the surround sensors of the second motor vehicle
404 second sensor signals
405 detection zone of the surround sensors of the third motor vehicle
406 third sensor signals
407 current detection result
501 shortest path of movement for refuge
502 information on the shortest path of movement
503 first activation signal
504 second activation signal
505 indicator lights

The invention claimed is:

1. A system (100) for increasing the security of road users without an own motor vehicle, comprising:
a plurality of motor vehicles (101, 102, 103), each having at least one vehicle security device (106, 107, 108) that can be activated by an activation signal (105) associated with a security assistance request (104) and that is connected to a wireless communication interface (109, 110, 111) at least for receiving the associated activation signal (105);
a mobile communication device (115) that can be carried by a road user (116) without an own motor vehicle and that has a wireless mobile communication interface (117) and a position-data acquisition unit (118) configured at least for continuous acquisition of its own current position-data (119), and for transmitting the acquired current position-data (119) and at least one security assistance request selected from a plurality thereof; and
a control device (120), connected to a wireless control-signal interface (121) at least for receiving the at least one selected security assistance request (104) and the acquired current position-data (119), and for transmitting activation signals (105) associated with the at least one selected security assistance request (104) to at least one assisting motor vehicle of the plurality of motor vehicles (101, 102, 103), wherein the control device (120) is configured to specify the at least one assisting motor vehicle at least also depending on the acquired current position-data (119) and the selected security assistance request (104),
wherein the mobile communication device (115) is also configured to transmit a destination position (123) to the control device (120), and the control device (120)

is configured to identify an appropriate path of movement (124) from the acquired current position (119) to the destination position (123), and to specify the at least one assisting motor vehicle also depending on its distance from the path of movement (124), wherein the at least one activatable vehicle security device (106, 107, 108) comprises at least one in-vehicle surround-sensor unit, which is designed to detect moving objects in a surrounding area of the motor vehicle concerned, and to transmit information on detected moving objects to the control device (120), and wherein the control device (120) is configured to transmit to the mobile communication device (115) the received information on detected moving objects or warning information if the received information on detected moving objects relates to a zone that overlaps a security zone around the current position of the mobile communication device (115).

2. The system according to claim 1, wherein the control device (120) is provided by means of a Cloud service (122).

3. The system according to claim 1, wherein the control device (120) is configured to identify as the appropriate path of movement (124), a path of movement for which the number of assisting motor vehicles is maximized within a specified distance from the path of movement.

4. The system according to claim 1, wherein the control device (120) is configured to access a database (125) containing geographic security-risk information (126), and to identify as the appropriate path of movement (124), a path of movement for which a total security risk is minimized along the path of movement.

5. The system according to claim 1, wherein the control device (120) is configured to transmit to the mobile communication device (115) the identified appropriate path of movement (124).

6. The system according to claim 1, wherein the at least one activatable vehicle security device (106, 107, 108) comprises vehicle lights of the motor vehicle concerned.

7. The system according to claim 1, wherein the at least one activatable vehicle security device (106, 107, 108) comprises an in-vehicle camera unit of the motor vehicle concerned, which is configured to start recording a video at the latest when the acquired current position of the at least one mobile communication device enters a field of view (301, 302, 306) of the in-vehicle camera unit, and to end the recording at the earliest when the acquired current position no longer lies in the field of view (301, 302, 306).

8. The system according to claim 7, wherein the motor vehicle concerned is configured to transmit the recorded video to the control device (120), and the control device (120) is configured to store the recorded video.

9. The system according to claim 8, wherein the control device (120) is configured to delete the stored recorded video when the acquired current position (119) of the mobile communication device (115) coincides with the destination position (123).

10. The system according to claim 1, wherein the control device (120) is configured to transmit a message to a security agency if the acquired current position (119) does not coincide with the destination position (123) within a time interval that depends on a length of the identified path of movement (124) and a rate of change in the acquired current position (119) of the mobile communication device (115).

11. The system according to claim 1, wherein the at least one activatable vehicle security device (106, 107, 108) comprises a door lock of the motor vehicle concerned, which door lock opens in response to the activation signal being received, and the control device (120) is configured to specify as the assisting motor vehicle, on receiving an emergency access request transmitted as the security assistance request (104) from the mobile communication device (115), the motor vehicle whose position is closest to the acquired current position (119) of the mobile communication device (115).

12. The system according to claim 11, wherein the control device (120) is also configured to transmit the position of the specified assisting motor vehicle to the mobile communication device (115).

13. The system according to claim 11, wherein the specified assisting motor vehicle is configured to emit, on receiving the activation signal, visual and/or audible signals.

14. The system according to claim 11, wherein the specified assisting motor vehicle is configured to establish a communication link to a security agency after receiving the activation signal.

15. The system according to claim 1, wherein the mobile communication device (115) or the control device (120) is designed to initiate remuneration of the at least one assisting motor vehicle.

16. A system (100) for increasing the security of road users without an own motor vehicle, comprising:

a plurality of motor vehicles (101, 102, 103), each having at least one vehicle security device (106, 107, 108) that can be activated by an activation signal (105) associated with a security assistance request (104) and that is connected to a wireless communication interface (109, 110, 111) at least for receiving the associated activation signal (105);

a mobile communication device (115) that can be carried by a road user (116) without an own motor vehicle and that has a wireless mobile communication interface (117) and a position-data acquisition unit (118) configured at least for continuous acquisition of its own current position-data (119), and for transmitting the acquired current position-data (119) and at least one security assistance request selected from a plurality thereof; and a control device (120), connected to a wireless control-signal interface (121) at least for receiving the at least one selected security assistance request (104) and the acquired current position-data (119), and for transmitting activation signals (105) associated with the at least one selected security assistance request (104) to at least one assisting motor vehicle of the plurality of motor vehicles (101, 102, 103), wherein the control device (120) is configured to specify the at least one assisting motor vehicle at least also depending on the acquired current position-data (119) and the selected security assistance request (104), wherein the mobile communication device (115) is also configured to transmit a destination position (123) to the control device (120), and the control device (120) is configured to identify an appropriate path of movement (124) from the acquired current position (119) to the destination position (123), and to specify the at least one assisting motor vehicle also depending on its distance from the path of movement (124), and wherein the control device (120) is configured to transmit a message to a security agency if the acquired current position (119) does not coincide with the destination position (123) within a time interval that depends on a length of the identified path of movement (124) and a rate of change in the acquired current position (119) of the mobile communication device (115).

17. A system (100) for increasing the security of road users without an own motor vehicle, comprising:
- a plurality of motor vehicles (101, 102, 103), each having at least one vehicle security device (106, 107, 108) that can be activated by an activation signal (105) associated with a security assistance request (104) and that is connected to a wireless communication interface (109, 110, 111) at least for receiving the associated activation signal (105);
- a mobile communication device (115) that can be carried by a road user (116) without an own motor vehicle and that has a wireless mobile communication interface (117) and a position-data acquisition unit (118) configured at least for continuous acquisition of its own current position-data (119), and for transmitting the acquired current position-data (119) and at least one security assistance request selected from a plurality thereof; and
- a control device (120), connected to a wireless control-signal interface (121) at least for receiving the at least one selected security assistance request (104) and the acquired current position-data (119), and for transmitting activation signals (105) associated with the at least one selected security assistance request (104) to at least one assisting motor vehicle of the plurality of motor vehicles (101, 102, 103), wherein the control device (120) is configured to specify the at least one assisting motor vehicle at least also depending on the acquired current position-data (119) and the selected security assistance request (104),
- wherein the at least one activatable vehicle security device (106, 107, 108) comprises a door lock of the motor vehicle concerned, which door lock opens in response to the activation signal being received, and the control device (120) is configured to specify as the assisting motor vehicle, on receiving an emergency access request transmitted as the security assistance request (104) from the mobile communication device (115), the motor vehicle whose position is closest to the acquired current position (119) of the mobile communication device (115), and
- wherein the control device (120) is also configured to transmit the position of the specified assisting motor vehicle to the mobile communication device (115).

* * * * *